United States Patent [19]
Voit

[11] Patent Number: 6,163,597
[45] Date of Patent: Dec. 19, 2000

[54] METHOD AND APPARATUS FOR ROUTING CALLS PLACED TO A VIRTUAL TELEPHONE NUMBER

[75] Inventor: Eric A. Voit, Baltimore, Md.

[73] Assignee: Bell Atlantic Network Services, Inc., Arlington, Va.

[21] Appl. No.: 08/388,058

[22] Filed: Feb. 10, 1995

[51] Int. Cl.[7] .................................................. H04M 11/00
[52] U.S. Cl. ....................... 379/93.17; 379/211; 379/220
[58] Field of Search ................................ 379/94, 93, 96, 379/201, 210, 211, 212, 220, 221, 207, 91, 93.17, 93.19, 93.25, 93.14, 142

[56] References Cited

U.S. PATENT DOCUMENTS

| | | |
|---|---|---|
| 4,191,860 | 3/1980 | Weber . |
| 4,757,267 | 7/1988 | Riskin . |
| 5,136,636 | 8/1992 | Wegrzynowicz . |
| 5,247,571 | 9/1993 | Kay et al. . |
| 5,390,232 | 2/1995 | Freeman et al. .......................... 379/201 |
| 5,506,897 | 4/1996 | Moore et al. ............................ 379/201 |

*Primary Examiner*—Stella Woo
*Attorney, Agent, or Firm*—McDermott, Will & Emery

[57] ABSTRACT

Territorial boundaries and the assignment of responsive telephone numbers are prescribed for a virtual telephone number. Telephone calls placed to that number, even though the territories are within a metropolitan or other relatively local area, are automatically routed to actual telephone numbers so that the responding telephone in each case depends on the territory from which the call is placed. For call processing, a switch receiving a call to a virtual telephone number momentarily suspends call processing and a first database is queried by entry of the calling station identity (ANI). The first database relates the calling station to a geographic location, preferably by postal zip code. Using the zip code, a second database, dedicated to the virtual number and relating zip codes to actual telephone numbers, is consulted. The telephone number assigned to the calling station's zip code is then returned to the switch. The switch resumes processing of the call to route it to that number. For multiple virtual telephone numbers, multiple second databases are provided, the first database serving as a common source for postal zip codes for entry into each second database. To set the content of a second database, an area map is produced from street segments and postal zip codes such that the map will encompass the territories. The territories are defined on the map by setting the boundary lines and from each territory the zip codes encompassed by the territories are extracted. To the zip codes, the actual telephone numbers are assigned, and the data for all of the territories are sorted for assembly into a file, or routing plan, for insertion into the second database.

36 Claims, 8 Drawing Sheets

| | CUST - ANI (TELEPHONE) | CUST - ZIP 4 (INTEGER) |
|---|---|---|
| 1 | 301-300-2010 | 212301234 |
| 2 | 301-300-3276 | 222221111 |
| 3 | 301-393-2503 | 212301235 |
| ⋮ | ↯ | ↯ |
| N | 301-393-4567 | 222221789 |

| EXTENDED ZIP CODE | DESIGNATES COMPANY TN |
|---|---|
| 21230-4124 | 301-774-3456 |
| 21230-4125 | 301-774-3456 |
| 21230-4126 | 301-388-1211 |
| ↯ | ↯ |
| 21230-9999 | 301-388-1211 |

| EXTENDED ZIP CODE | SUBSCRIBER BRANCH |
|---|---|
| 21230-4124 | 1 |
| 21230-4125 | 2 |
| 21230-4126 | 3 |
| ↓ | ↓ |
| 21230-9999 | 3 |

FIG. 9A

| SUBSCRIBER BRANCH | BRANCH TEL. NUMBER |
|---|---|
| 1 | 301-774-3456 |
| 2 | 301-340-0766 |
| 3 | 301-388-1211 |

FIG. 9B

METHOD AND APPARATUS FOR ROUTING CALLS PLACED TO A VIRTUAL TELEPHONE NUMBER

TECHNICAL FIELD

This invention relates to techniques for routing virtual, or universal, number telephone calls to actual telephone numbers of parties who, depending on the geographical areas from which the calls arise, are responsible for responding to the calls; and, in one aspect, it relates to techniques whereby a subscriber for a virtual number can pre-define the geographical areas and customize the routing plans for those areas.

BACKGROUND ART

A practice now common in the telephone industry is to provide a subscriber, typically a business or commercial entity, with a single telephone number to serve diverse geographical areas or territories. Calls placed to that number are routed to respondents who are appointed to serve the respective areas from which the calls originate. While the terminology may differ, depending on the exact context, the single telephone number is sometimes referred to as a "virtual" number since it represents no telephone station in particular, but rather is the calling number for a plurality of stations, each of which may have its own actual directory number.

Virtual numbers have been used in a long-distance context whereby a single number is promoted on a large scale, typically nation-wide, and calls to the number are carried by an inter-exchange, or long distance carrier. The number for these wide area services is usually a special service access number such as an 800 or 900 number, depending on whether the called party or the caller is to be responsible for the call charges. The prior art is predominantly directed to handling calls received on a wide area basis and from areas whose boundaries are rather static and predefined.

A patent to Weber, U.S. Pat. No. 4,191,860, for example, discloses a system whereby a caller dials an 800 number, which, along with the caller's area code (i.e., the NPA, or numbering plan area code), is then used to access a translation table stored in a database system and retrieve an ordinary telephone number to which the call is consequently routed. This is the so-called WATS to POTS translation (Wide Area Telephone Service to Plain Old Telephone Service), now widely deployed by interexchange carriers in a variety of forms. Since the NPA is indicative of a certain geographical area from which the call originates (there are some 200 NPAs in the country), the translation can be made to yield a POTS number for a party who is especially suited to respond to calls that originate from that area. Thus, callers from different areas, as determined from their area codes, may be routed differently. This arrangement is adequate only if all calls from the same area code are to be routed to the same destination.

Another patent, U.S. Pat. No. 4,757,267, to Riskin, discloses a system that directs an 800 call (the dialed digits of which uniquely identify a product or service) to a dealer in those goods or services who is located in some proximity to the calling station. From knowledge of the originating telephone number the call is first routed to a service company in the general vicinity of the caller. A vertical-horizontal (V-H) file, equivalent to latitude and longitude, locates each dealer and the calling station so that a comparison of their V-H coordinates determines the dealer who is closest. Once the nearest dealer is determined, that dealer's telephone number is dialed automatically. Alternatively, Riskin suggests use of a database according to the Weber model whereby that database, upon being queried with the 800 number and the NPA, sets up a call to another database, providing to it the dialed 800 number and the calling station's NPA and exchange code. Again, from the respective V-H coordinates, the second database system determines the nearest dealer and the POTS number is returned through the facilities associated with the first database for call completion. The focus of the Riskin patent is on getting the long distance caller to the dealer who happens to be closest even though that dealer may not be the dealer assigned to a predefined territory.

A patent to Wegrzynowicz, U.S. Pat. No. 5,136,636, also routes calls to local dealers by building upon the use of a Weber type of database. In operation, a caller dials the virtual 800 number (ten digits) and a primary database (i.e., the Weber database) is accessed using the NPA of the caller and the 800 number; the output of the primary database is a number that identifies one of a plurality of secondary databases for a customer, and a key identifying the customer, for access. That information is then returned from the database, through the associated signaling system, to a network screening office. A translation is made to determine which secondary database of the customer to access. The access key plus the first six digits of the caller's directory number or the entire number is then cross-referenced to a local dealer telephone number, which is returned to the switching system of the network for call routing. As with the system upon which this is built (i.e., the Weber system), the process starts with an 800 number and an input indication of the calling station's location.

Notably, this latter patent expressly recognizes that, only under special circumstances are these techniques applicable for intra-LATA or local services. In particular, the patent notes that "If nationwide 7-digit numbers (for example, numbers beginning with 950) can be allocated for a limited number of dealers, then this service can also be provided as an Intra Local Access and Telephone Transport Area (Intra-LATA) call . . . " (Col. 6, lines 19–23). The described service is applicable locally only with the assignment of special numbers.

Despite the prior focus on wide area service, however, there is also a need for techniques which will facilitate somewhat more localized virtual number usage and which will be particularly adaptable to prescribe call routing from territories whose boundaries are subject to change from time to time. As an example, a hypothetical pizza franchise chain, operating across a wide geographic area or even nationally, may promote a single 800 telephone number for customers anywhere within the area to call. When the number is called, the customer is put in touch with the local pizza outlet. There is also a demand for this kind of call routing service on a localized, intra-LATA, basis (i.e., non-long-distance) so that calling customers only have to dial what appears to be a typical seven digit telephone number, and not necessarily an 800 or 900 special service access number. Thus, expressed in terms of the pizza chain example, instead of operating nationally, the pizza establishment may operate only in a single metropolitan area and have localized outlets therein whose territories are expected to be defined, not necessarily by area code, but by streets and local addresses. Desirably, these outlets would all be served by a single metropolitan seven digit phone number such that each outlet receives calls that originate in its assigned territory and such that the boundaries of the assigned territories can, for the call routing service, be established and redefined as required for serving changing needs of the establishment.

DISCLOSURE OF THE INVENTION

Accordingly, among the advantages of the present invention is that calls to an ordinary 7-digit local directory virtual number can be routed to an appropriate one of a plurality of territorial dealers or representatives. The calls need not be limited to local calls, but may still be special service calls of the 800 and 900 call type. A further advantage of the invention is that routing for each call can be determinable on the basis of only the calling station's number as an indication of geographical location without particular recognition of the calling station's area code. Still further advantages of the invention are that virtual number subscribers can define the boundaries for their dealer or agent territories, can customize the routing plans therefor, and can enter those routing plans on their own so that calls to their virtual numbers are routed accordingly.

In preferred form of the invention, the boundaries of the territories and the assignment of responsive telephone numbers are prescribed by the subscriber (or customer) for a virtual telephone number. Telephone calls placed to that number, even though the territories are within a metropolitan or other relatively local area, are automatically routed to actual telephone numbers so that the responding telephone in each case depends on the territory from which the call is placed.

From a call processing perspective, a switching means receiving a call to a virtual telephone number will recognize, from the dialed digits, that the call requires special routing instructions. The switch momentarily suspends its processing of the call and, by way of advanced intelligent network (AIN) facilities, a first database is queried by entry of an identification of the calling station (usually the ANI). The first database contains data relating the calling station to an indication of the calling station's geographic location. Preferably, the indication of location is the postal zip code for the calling station since that information is readily available from the telephone company's subscription files for billing and other purposes. The postal zip code used can be either the standard five digit code or the nine digit number assigned to more discretely defined areas. The database can store codes in various degrees of specificity.

Using the postal zip code, a second database, dedicated to the virtual number being called is consulted. This database contains data relating postal zip codes to corresponding subscriber locations as predefined by subscriber selection. The subscriber location data can be represented by the actual directory number of the particular subscriber servicing agent or by a smaller digit code that identifies the particular agent. In the latter alternative, a third database is consulted that relates the agent identification code to the actual directory number. The use of three databases enables ease of data entry in the highly populated second database as the smaller digit identification code field is significantly less cumbersome, and subject to less error, than the large digit directory number. Moreover, if an agent's directory number subsequently is changed, only a single entry need by made to the third database, rather than change each entry associated with that agent in the second database.

The actual directory number of the agent is thus retrieved, either from the second database in the first alternative or the third database in the second alternative, and is then returned to the switch in a response message. The switch resumes processing of the suspended call to route it to the retrieved destination number. To serve multiple subscribers, each of which may have more than one virtual telephone number, multiple second and, if appropriate, third databases are provided, one set for each virtual number. The first database can serve as a common source for postal zip codes for entry into each second database.

For setting the content of the second database to reflect the boundaries of territories served by the virtual number, an area map is graphically produced on a processing terminal. Line segments, primarily street segments and postal zip codes are used to create a map large enough to encompass the various territories. The territories are defined on the map by setting surrounding boundary lines From each territory so bounded, the postal zip codes thus defined are extracted. The actual agent destination telephone directory numbers are assigned to the postal zip codes, and the data for all of the territories are sorted for assembly into the second database.

Additional objects and advantages of the present invention will become readily apparent to those skilled in this art from the following detailed description, wherein only the preferred embodiment of the invention is shown and described, simply by way of illustration of the best mode contemplated for carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF DRAWINGS

FIG. 9A and FIG. 9B, respectively, are tables that relate postal zip code information with subscriber destination information in an alternative manner to the second database represented in FIG. 3.

BEST MODE FOR CARRYING OUT THE INVENTION

The innovative method and apparatus described here operate within the framework of what has come to be known as an advanced intelligent network (AIN). In an AIN system, central offices having a service switching point (SSP)

exchange data messages with an integrated services control point (ISCP) via a switching transfer point (STP). At least some calls are thus controlled through multiple central office switches using data retrieved from a database in the ISCP. A more exhaustive description of an AIN system, suitable for implementation in connection with the present invention, is provided in U.S. Pat. No. 5,247,571 to Kay and McConnell, the disclosure of which is incorporated herein by reference. The Kay and McConnell patent is assigned to the assignee of the present invention.

Figure 1:
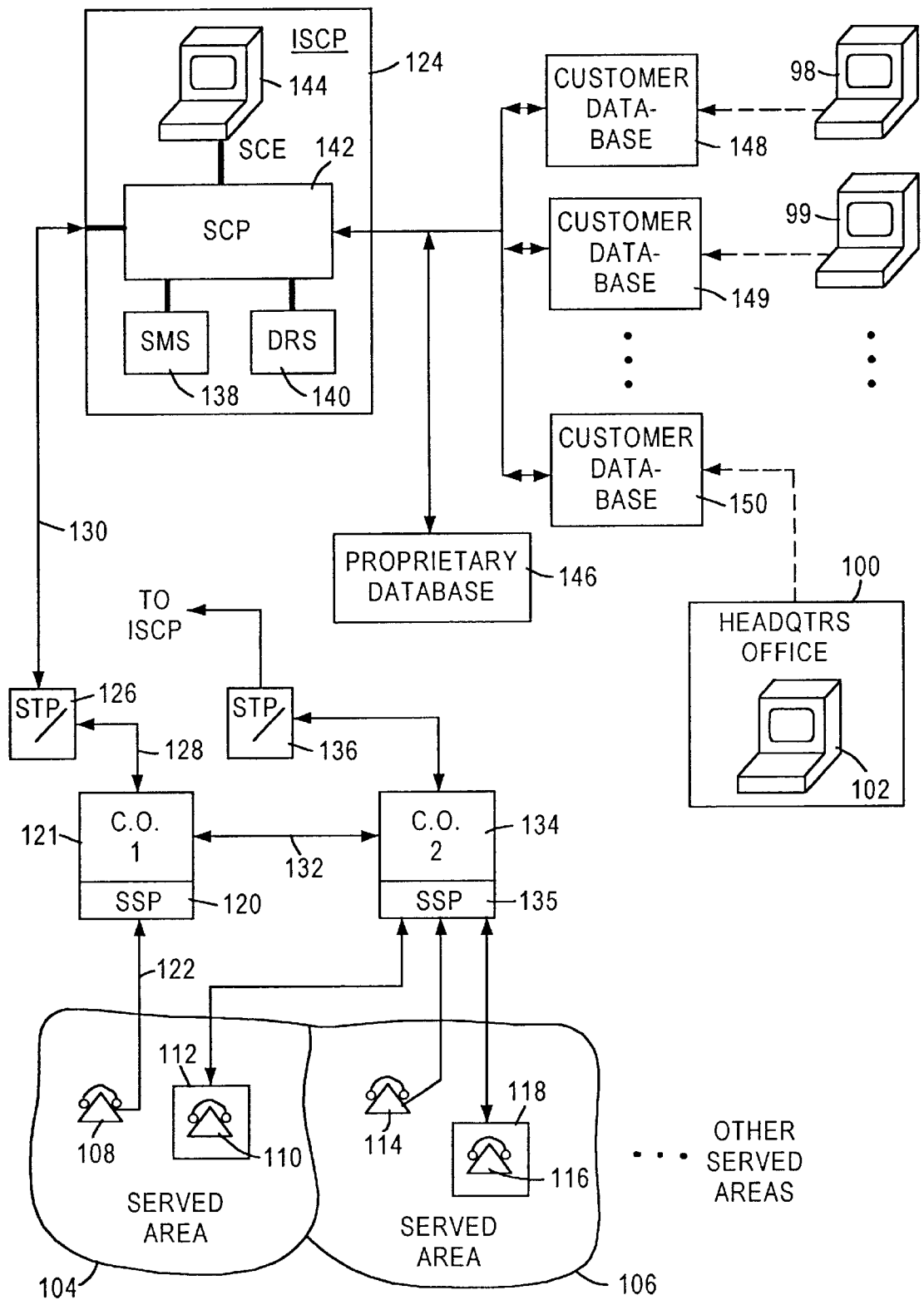
FIG. 1 is a schematic block diagram schematically illustrative of a telephone system including call routing and processing in accordance with the invention.

FIG. 1 is a block diagram of a telephone system, including components of an advanced intelligent network and of the present invention, which helps to illustrate the invention's structure and operation. It will be recognized, of course, that FIG. 1 is considerably simplified for explanation purposes and that the full network and operating environment for the invention may comprise multiple central offices, diverse interconnections, and provisions for reliability through redundancy, all of which need not be shown for developing an understanding of the invention.

It may be assumed that a subscriber for telephone call routing services has a main office (or headquarters facility, etc.) 100 which includes a graphical processing terminal 102 for use by the subscriber to define territories from which telephone calls placed to the subscriber's virtual number are to be routed to actual, subscriber pre-selected, telephone numbers. The function and operation of the graphical processing terminal 102 will be covered in detail in the ensuing discussion. Strictly, the main office 100 need have no fixed location, however, nor is there any absolute requirement that there even be a main office. Graphical processor 102 is accessible by the subscriber, or someone, on the subscriber's behalf, for purposes of defining boundaries and setting routing telephone numbers. The graphical processor 102 may be located, for example, in any of the defined territories and may, in fact, be entirely portable for operation at any convenient location. It is preferably a stand-alone processor, as will be described below, and need have no permanent or continued connection to any other system component.

As illustrated, the subscriber has various served territories, including contiguous served areas 104, 106, and others as indicated. All of the served areas, taken together, may cover some broad geopolitical area such as a city or county, or they may cover the combination, for example, of a city and county, or some more extensive area. The served areas need not be contiguous, however, and there may be served areas which are isolated from others. Generally, a call placed to the subscriber's virtual telephone number from telephone 108, for example, located in served area 104, will be routed to the telephone 110 located in the subscriber's branch office 112 (or an agent's office, etc.) which is also located in area 104; similarly, a call to the virtual number from calling station 114, located in area 106, will be routed to the telephone 116 located in the subscriber's facility 118, which also happens to be in the same area 106 as the calling station 114. Calls arising in other served areas of the subscriber will similarly be routed to an appointed branch office. It is not necessary for the calling station and the branch outlet to be in the same territory; it is desired only to route a call to a telephone where someone can appropriately respond to calls from the originating area.

A call to the subscriber's virtual number from telephone 108 begins with a party at the calling station 108 dialing that number. The virtual number may be the usual 7-digit telephone number, a full 10-digit number including the three NPA digits, or an 800 number. In any case, an SSP 120 (i.e., a switching means) located in a first central office 121 receives the dialed digits by way of the local loop 122. The SSP 120, programmed to recognize the virtual number as an action trigger requiring AIN direction for routing, momentarily suspends processing of the call and formulates a query message for that purpose to be sent to the ISCP 124. The query message format and the means of its conveyance to the ISCP 124 are as described in the Kay and McConnell patent, but for present purposes it will include the subscriber's virtual number and an indication, such as the automatic number identification (ANI), of the calling station's number. It will also include an indication of call type (here, that the call is placed to a virtual number) so that the ISCP has an indication of the treatment the call is to receive.

The message signaling pathway to the ISCP 124 is by way of STP 126, connected on one side by data link 128 to the central office 121, and on the other side to ISCP 124 by data link 130. The ISCP 124, in conjunction with peripheral databases, is operative, as will be described, to determine from the subscriber's virtual number and the calling station's ANI, the actual phone number of telephone 110. Once determined, that number is returned in an appropriately formatted routing message, by way of STP 126, to the SSP 120 of central office 121. Upon receipt of the routing message, the SSP 120 resumes call processing for the call and it is routed, in this case, via trunking system 132, to a second central office 134 serving telephones 110 and 116 located, respectively, in the subscriber's branch offices 112 and 118. The second central office 134 delivers the call to telephone 110.

By similar processing, a call originating at telephone 114 in the subscriber's territory 106 will be routed to the telephone 116 in the subscriber facility 118. In this latter case, however, since the call is both originated and terminated by the second central office 134 there is no routing from one central office to another. Nevertheless, the ISCP 124 is queried for virtual number routing instructions. Thus, the second central office 134 also includes an SSP 135 and has access to the ISCP 124 through an STP 136 and associated data links for virtual number call routing purposes even though the call itself is not routed beyond the serving central office 134. As will also be recognized by those of skill in the art, in the event a call is routed from one central office to another, the ISCP 124 may be queried for routing instructions by either the originating or the terminating SSP.

The ISCP 124, comprised of a service management system (SMS) 138, a data and reporting system (DRS) 140, a service control point (SCP) 142, and a service creation environment (SCE) 144 is described in the Kay and McConnell patent. The SCE 144 provides a gateway for initial entry and updating of data pertinent to call routing in accordance with the invention. For what may be regarded as typical AIN applications, the ISCP 124 provides a complete system for carrying out the function of those applications. When operative for the present invention, however, the SCP 142 of the ISCP 124 has access to additional databases, including, first, a proprietary database 146, and second, a plurality of customer accessible databases 148–150. The first database is proprietary the sense that the operator of the telephone system is its proprietor. Of the customer accessible databases 148–150, there is one for each virtual number in operation (i.e., usually a database for each virtual number subscriber).

Figures 2, 3, 5:
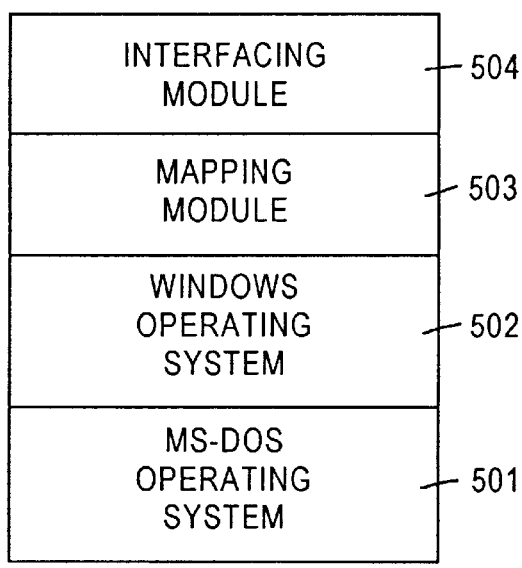
FIG. 2 is a table illustrative of a first common database that relates ANI information with postal zip code information.
FIG. 3 is a table is illustrative of a second database that relates postal zip code information with subscriber destination information.
FIG. 5 is a simplified block diagram of the software architecture for a graphical processing terminal according to the invention.

The contents of the proprietary database 146 is accessible only to the telephone operating company. Its contents include a file relating the telephone number of calling stations (including telephones 108, 114, and others) to an indicator of the geographic location of each calling station. Preferably, the geographic indicator is the postal zip code of each station's location, and most preferably it is the full 9-digit postal zip code so that the geographic location of a calling station is precisely indicated. This information is available from the operating company's business files since it is generally obtained for billing and other purposes when a customer signs up for basic telephone service. This relational data for database 146 is loaded and is accessible for other data management purposes, such as file updating, through the SCE 144 and SCP 142. FIG. 2 provides an example of the file contents of the proprietary database 146.

The customer accessible databases 148–150 are preferably provided and maintained by the telephone operating company, but they are each accessible by the customer, or subscriber, so that data can be entered and altered as required to create customized call routing plans, or tables, for the virtual number to which the particular database relates. For that purpose, each subscriber has available a graphical processing terminal to create the data that gets loaded into the respective customer databases. Office terminal 100 is associated with customer database 150, and terminals 98 and 99 are associated, respectively, with customer databases 148 and 149. The data content is essentially in the form of a table, for the particular virtual number, that relates geographical indicators from the proprietary database to actual telephone numbers of the subscriber's appropriate agent or branch office. Preferably, the table relates a calling station's 9-digit postal zip code to a branch outlet telephone. Effectively, by determining the relationship between zip codes and actual telephone numbers, the subscriber is able to set boundaries for territories to be served by various branch offices. FIG. 3 is an example of the file contents of a customer accessible database.

In operation, whenever the ISCP 124 receives a virtual number routing query message from a central office, the SCP 142 accesses the proprietary database 146 with the directory number of the calling station (the ANI) and retrieves the corresponding 9-digit zip code. Using the subscriber's virtual number, the customer database that contains the routing plan for that number, from one of databases 148–150 is then accessed, and the 9-digit zip code is cross-referenced to the corresponding actual telephone number. By this arrangement, the proprietary first database 146 serves as a common reference point for access to any number of virtual number databases 148–150, each available to a subscriber for independently customizing its own routing plans as desired for their particular business. One second database, for example, might contain the routing plans for a pizza business, another the plans for a hotel chain, and others the plans for still other businesses or purposes. All of these draw upon the relatively static content of the first database while providing the dynamics needed for customization through the second databases.

Figure 4:
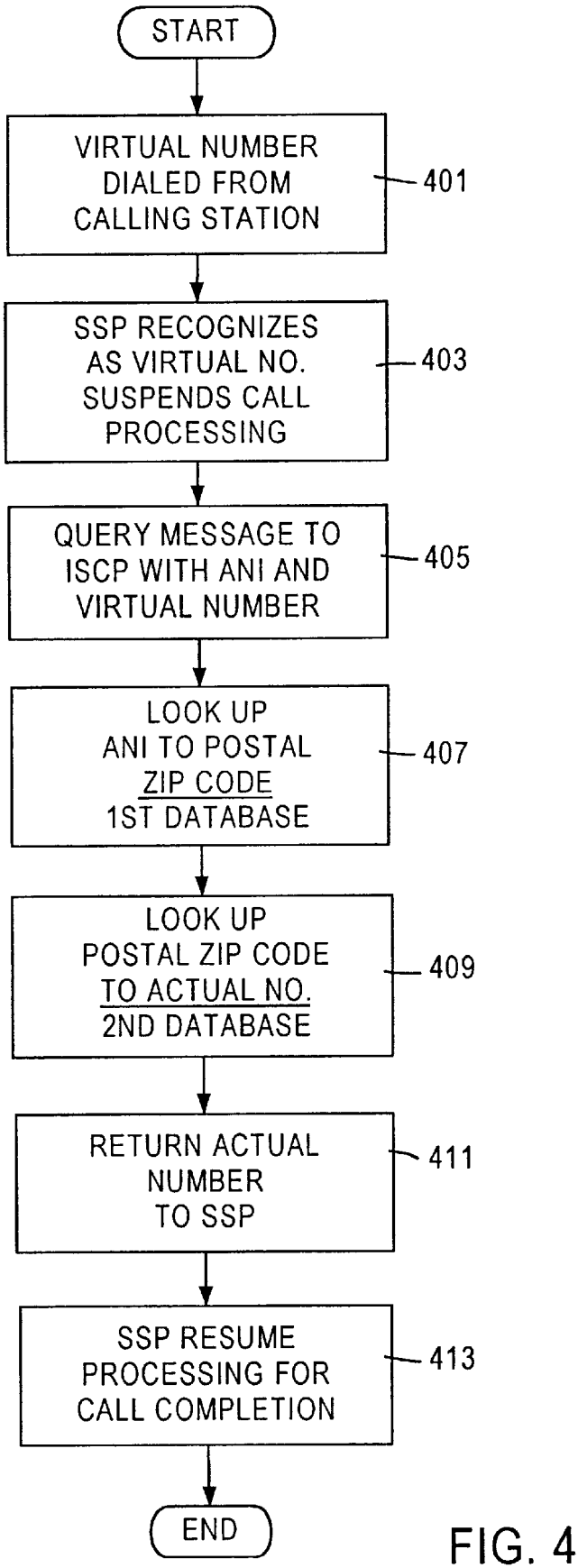
FIG. 4 is a simplified block flow chart exemplifying the processing steps for call routing in accordance with the invention.

The flow chart of FIG. 4, considered with FIG. 1, outlines the overall call processing steps. Initially, at step 401 the calling station e.g., station 108, goes off-hook and the virtual telephone number is dialed from there. The SSP 120 in central office 121 recognizes from the dialed digits, in step 403, that the call is to a virtual telephone number and, therefore, that the ISCP 124 must be consulted for routing instructions. This action trigger causes the SSP 120 to momentarily suspend its processing of the call, and, at step 405, to formulate and send a query message to the ISCP 124. The query message is in a standardized format, but it includes the virtual number and the ANI for the calling station 108. The ISCP 124, in turn, upon receipt of the query, acts through the SCP 142, to access the system's proprietary database at step 407 and to look up the postal zip code corresponding to the received ANI. Other geographic indicators besides zip codes can be used, but for reasons that will become clear, zip codes are preferred. The geographic indicator, whether zip code or otherwise, is transparently used by the subscriber. At step 409, with the postal zip code determined, and from the virtual number, the SCP 142 then turns to the appropriate customer database 150. Database 150 contains a file, created by operation of graphical processor 102 and uploaded therefrom, that relates the zip code to an actual telephone number. In this case the actual telephone number determined is that of telephone 110 located in the subscriber's branch office 112 in served area 104. Once the telephone number is retrieved from the customer database 150, it is forwarded in a response message at step 411 back to the SSP 120 in central office 121. The SSP 120 then, in step 413, resumes its processing of the call by directing it to the second central office 134 which sends it to the telephone 110.

Although there may be various ways to put together the relational data required for populating a customer database, a graphical terminal, such as terminal 102, provides a way for the subscriber merely to set the geographic boundaries of served territories without having to deal directly with the geographic indicators, e.g., zip codes, used in the customer database. Such a terminal would eliminate a need for using manual methods to select and draw boundaries around all of the territories to be served, to pick out of each territory all of the 9-digit postal zip codes and relate them to the appropriate phone number, and then to sort the various territorial data into an organized table for entry into the database.

A personal computer (PC), preferably one that is compatible with MS-DOS and Windows (trademarks of Microsoft Corporation) operating systems can serve as the starting platform for a graphical processing terminal. The software hierarchy for such a processor is illustrated in FIG. 5. At the most basic level are these well known operating systems, MS-DOS and Windows, 501 and 502, respectively. On top of the two operating systems and interactive therewith is a "mapping" software module 503, which is operative to assist in the creation of street and other kinds of local area maps for graphical presentation to a user on the terminal's screen (not illustrated). The mapping software 503 is preferably one of the many commercially available software packages capable of providing a base set of functions for creating maps and a programming language with which particular applications can be integrated with map presentations. Suitable mapping software is available, for example, from MapInfo Corporation of Troy, N.Y. under the names MapInfo for Windows and MapBasic for Windows, and from TerraLogics, a corporation having an office in Reston, Va., under the name TerraView.

Interactive with the mapping software module 503 in the Windows environment is an interfacing software module 504 to facilitate, overall, a "negotiation interface" for area number calling, i.e., for virtual number calling plans. As will become clear, one purpose of the interfacing module 504 combined with the mapping module 503 is to provide a virtual number subscriber the ability to create arbitrarily bounded geometric areas that may include, for example, polygons and circles. These areas are designed by the user as desired to become served areas for specified subscriber branches in accordance with files automatically created for those areas that relate postal zip codes to actual phone numbers. Such files can then be exported to the customer data bases maintained for call routing.

Figure 6:
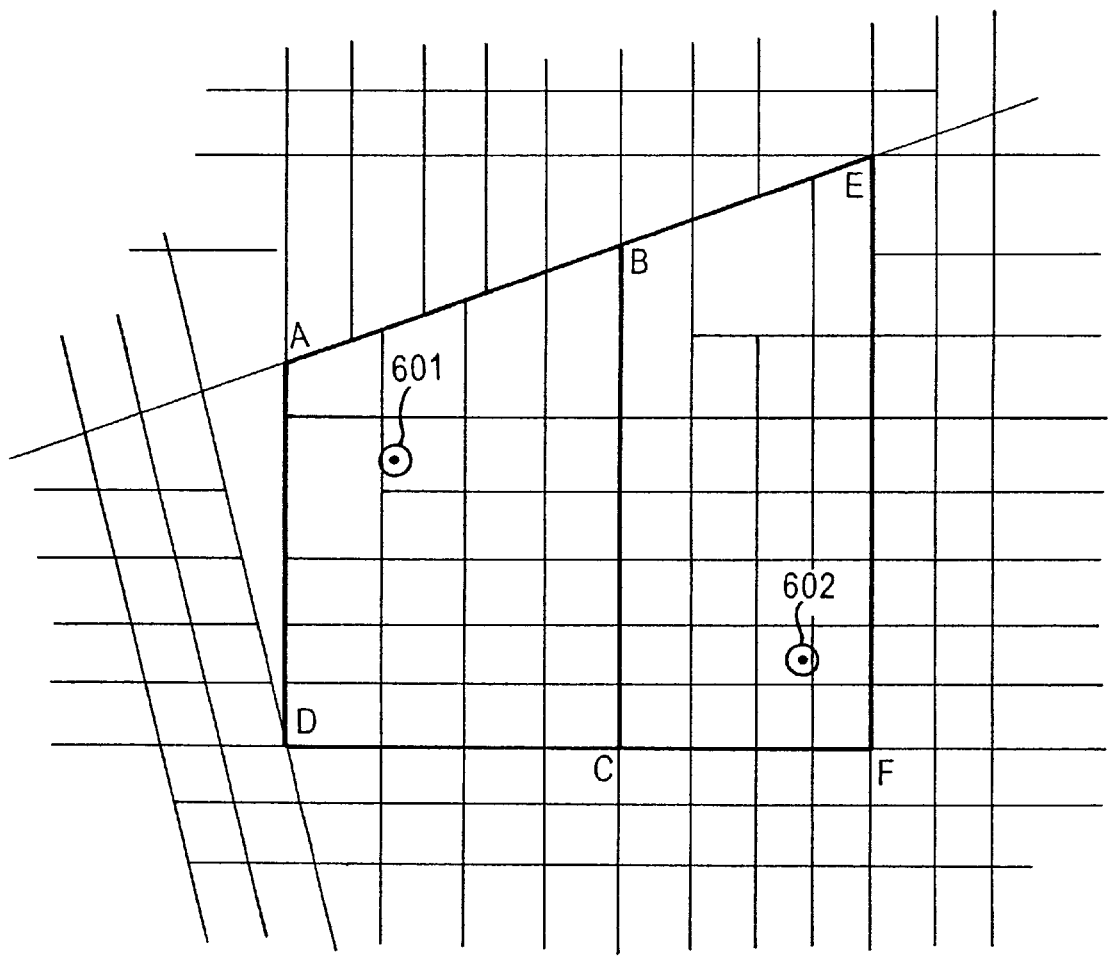
FIG. 6 is a representative simple street map illustrative of the process of setting territorial boundaries and for extracting geographical data.

FIG. 6 illustrates the process. A map of the general area of interest, such as the relevant portion of a city street layout, can be retrieved and displayed on the terminal screen. The map is sufficiently encompassing to include the service area being created. Here, the map includes two contiguous service areas which have been arbitrarily created by a user at the terminal. One of the areas is defined for present reference, as bounded by points ABCD and the other by points BEFC. Any area, or areas within the map displayed can be selected and highlighted on the screen, and the map can be made larger or smaller as desired. Branch outlets, 601 and 602, are shown, respectively, as being contained within the two defined areas. The telephone numbers of serving branch outlets, not necessarily the actual branch locations, are to be assigned to the areas created. While the telephone numbers are assigned by entry from the subscriber, once the boundary points are set on the map, the subscriber is relieved of the necessity of being aware of postal zip codes or other geographical indicators.

The system automatically takes cognizance of the postal zip codes encompassed within each of the two areas and forms for each, a table relating those zip codes, preferably 9-digit zips, to the assigned telephone number. Once that is done for all of the subscriber's areas, of which there may be many, the resulting tables are sorted to create a larger file, such as exemplified in FIG. 3. These subscriber routing plans, generally in ASCII format, are loaded to the subscriber's database, e.g., database 150 of FIG. 1. The upload can be carried out in various ways, including sending the data via dial-up telephone lines for direct entry, or by forwarding the file recorded on a disk or tape for entry by telephone system operating personnel. These techniques will also be used to add a branch office to those already existing, to update a branch office profile, or to delete a location.

The uploaded data files are derived from the creation of the area boundaries of the map that is displayed. The map is formulated by the mapping module 503 (FIG. 5) and the interface module 504. The map is created from street segment information relating to the area of interest and from geographical coordinates such as latitude and longitude, which, in this case are selected for the postal zip codes in the area. Such information is available from commercial sources. The street segment information can be obtained in a convenient format from Map Info Corporation, as is the basic map creation software, or from other sources, including the U.S. Census Bureau in what are known as "Tiger Files." The latter files generally will have to be converted from ASCII format for use with the mapping module in creating the map. A source for data files that relate postal zip codes to latitude and longitude and street locations is available from Bamberg-Handley, Inc. of Winter Park, Fla.

Figure 7:
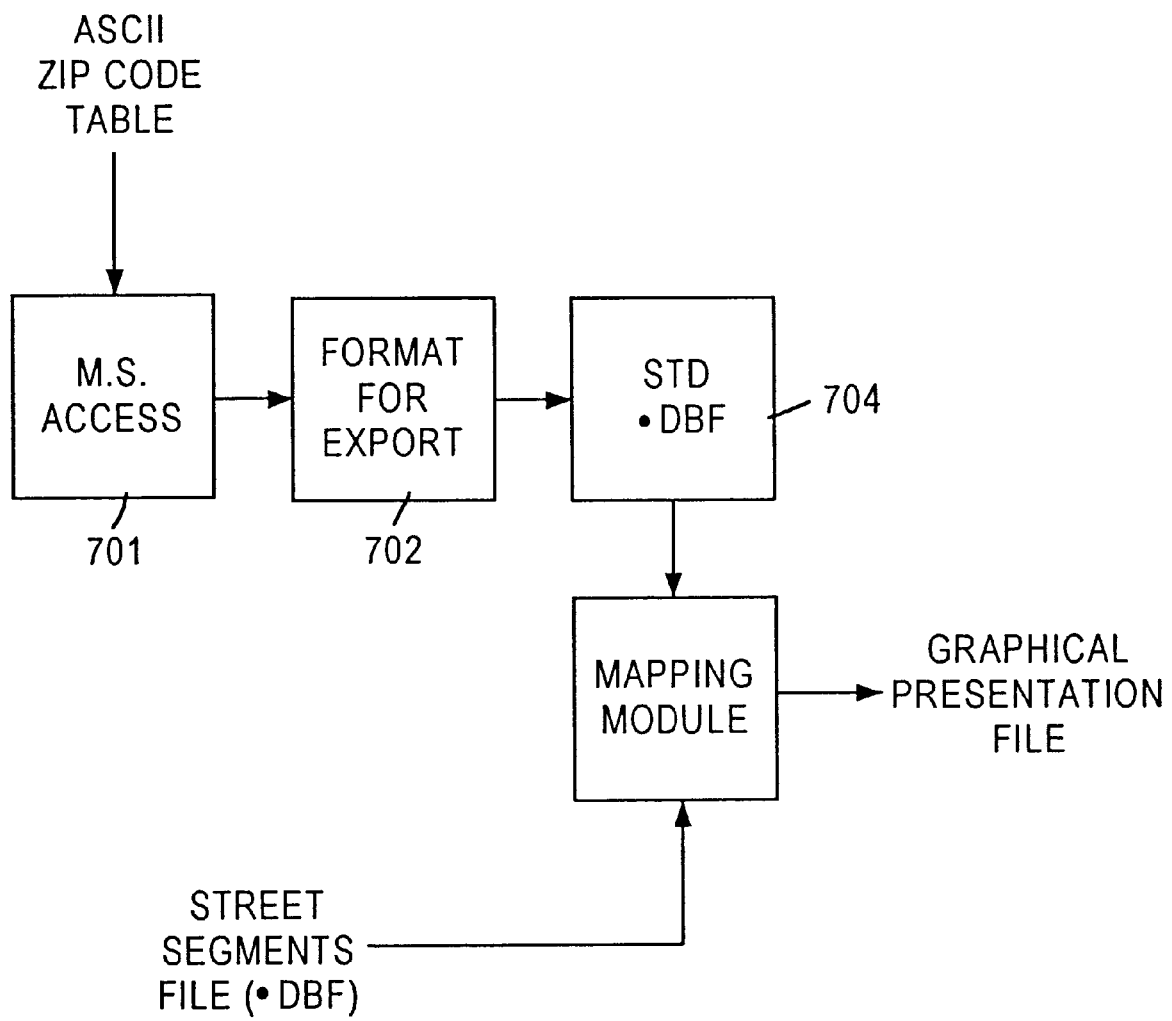
FIG. 7 is a block diagram exemplifying a data conversion process for entry of data into a mapping module of the kind used to produce a map as shown in FIG. 7.

FIG. 7 is a chart that illustrates the process, with the assumption that the zip code/latitude-longitude files require a conversion process whereas the street segment files do not. Starting with an ASCII zip code file, a program from Microsoft Corporation known as Access is used at step 701 to parse the starting files into segments of interest and put them in an intermediate database format at step 702 for export to a standard database format known as .DBF at step 704. The .DBF formatted files are in form for conversion by the mapping module 503 (FIG. 5) to a graphical presentation file. Similarly, but without the need for conversion, the street segment information is provided to the mapping module, also for conversion into a graphical form. The mapping module 503 converts the tables from .DBF format into a map format by tying graphic objects into a file that is matched against the input files. Latitude and longitude of points are taken and the street segments are used to build lines in between them. The zip codes are treated as points such that when the territories are created a zip code will be treated as being either wholly in or out of a defined area.

The map displayed provides a framework or template for use in creating the various territories so that once an area is bounded the enclosed portion is then matched against the zip code file to select a subset of zip codes from those included in the entire map. For example, the zip codes bounded by the two polygons, ABCD and BEFC of FIG. 6., would be extracted from the file of zip codes used for the formation of the entire map. From that selection, a telephone number is assigned for each territory to result in a number of files equal to the number of territories created. These files are then sorted by zip code and combined into a larger file which is uploadable to the subscriber's database in the call routing system.

Figure 8A:
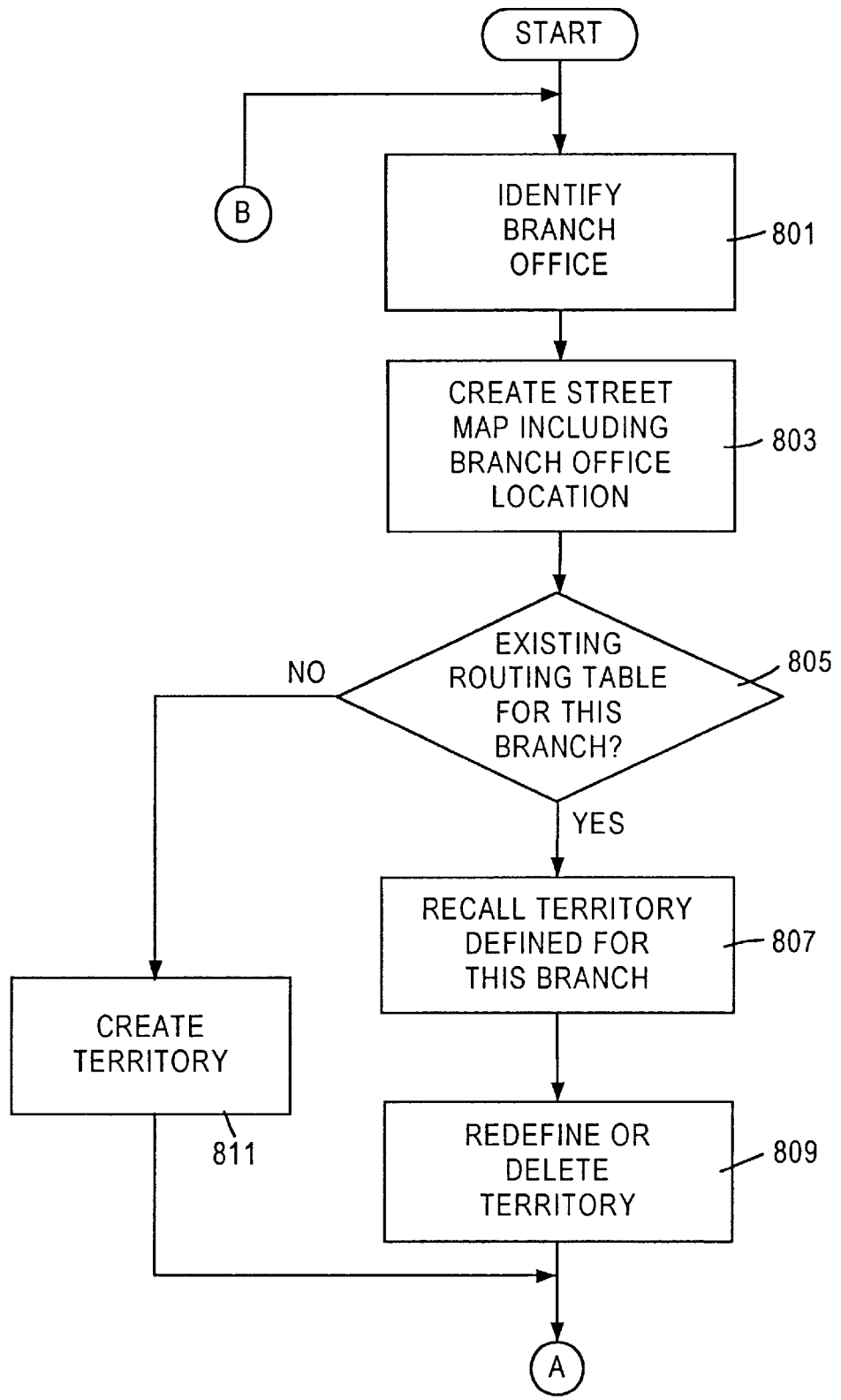
FIG. 8A and FIG. 8B, taken together, provide a simplified block flow chart exemplifying the steps carried out to produce the relational data for a routing plan to be entered into a customer accessible database.
Figure 8B:
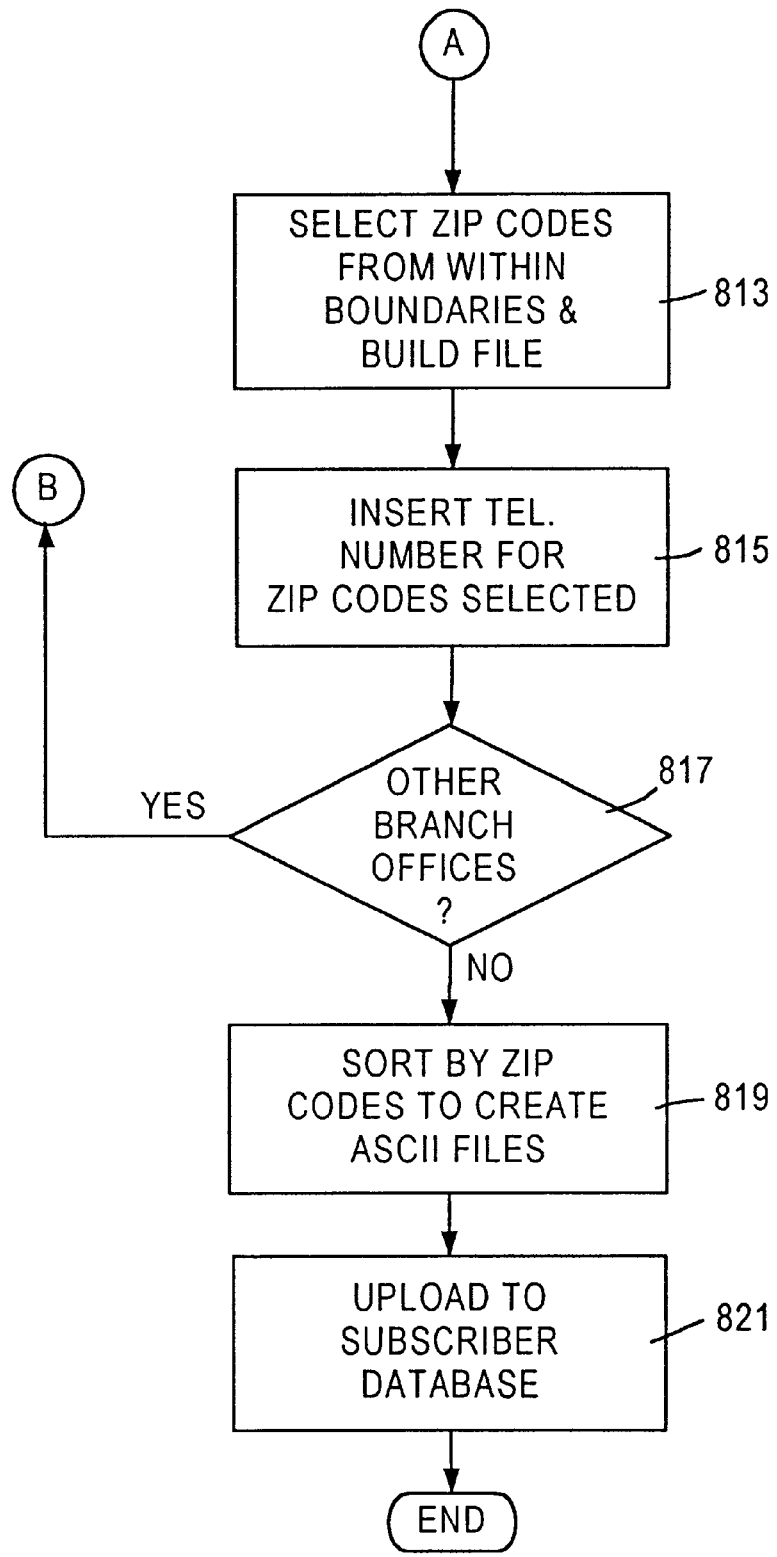

FIGS. 8A and 8B outline the operative steps carried out by or through a graphical processing terminal when territorial routing plans (tables) are created for a subscriber. Although the steps are diagrammed sequentially, certain steps may be performed essentially simultaneously or the order of performance may be inconsequential.

Initially, at step 801, the branch office location is identified. That is, inputs are provided by a subscriber to the terminal to identify, for example, the street address and city of the branch office whose territory is to be configured and for which a routing plan is to be created. The branch office need not be inside the territory but it should be within the general area to initiate the map presentation. Step 801 is performed whether adding, updating, or deleting branch offices. Using the information on zip codes and street segments previously made available, the map creation module 503 (FIG. 5) causes an area map to be presented in step 803. At step 805 a determination is made as to whether a routing table already exists for the branch. If a table already exists then the territory to which the existing table applies is recalled at step 807. At step 809, the user is given an opportunity to either redefine the territory as if it were being newly created or to delete the territory altogether. If, however, at step 805, it is determined that there is no existing routing table or plan for the particular branch office under consideration, then the subscriber is allowed at step 811 to create a territory. The subscriber can draw in the boundary lines to enclose some subset of the map, thereby automatically selecting the 9-digit postal zip codes within the bounds of the defined territory to be covered by the branch office.

The interface program 504 (FIG. 5) is operative at steps 813 and 815 to build the file of zip codes versus the branch office telephone number. With a file for one branch office done, a determination is made at step 817, automatically or not, as to whether the process needs to be performed for other branch offices. If so, then the process is simply recycled back to step 801 and restarted for the next branch office whose territory is to be configured. Once all branch offices have been processed, there is an exit from step 817 to step 819 which operates to sort the individual branch files into an overall file which is formatted for export from the processing terminal. Finally, at step 821, the overall file, relating postal zip codes to the subscriber's branch office telephone numbers, is uploaded to the database 150 that is especially maintained for the subscriber. The subscriber's routing plans are then ready for implementation.

FIGS. 9A and 9B represent an alternative arrangement wherein the second database, having a table illustrated in FIG. 3, is replaced with two lookup tables that may be considered to comprise second and third databases. The routing plan data base table of FIG. 9A correlates ANI information with branch number indicators, the result of which is then used to access database table of FIG. 9B to obtain the actual branch destination telephone number. That number is returned from the ISCP 124 to the appropriate central office SSP for routing the call.

The use of second and third tables, in addition to the common ANI-zip code database table, for destination number routing correlation affords greater ease of data entry for initial setup and subsequent changes. The second table, that includes extended zip codes, is a relatively highly populated table. Correlation of zip codes with a one or two digit branch identifier saves entry of a ten digit telephone number for each of the zip code entries. The third table is limited in population to the number of subscriber branches. The ten digit telephone number of a branch is entered only once in that table. If, at a later time, the telephone number for a branch is changed, only the one entry in the third database table need be changed, without disturbing the entries in the second database table.

Only the preferred embodiments of the invention and but a few examples of its versatility are shown and described in the present disclosure. It is to be understood that the invention is capable of use in various other combinations and environments and is capable of changes or modifications within the scope of the inventive concept as expressed herein.

What is claimed is:

1. For use in a system that determines routing instructions for telephone calls to be routed from calling stations within various geographic territories to destination stations when the calls are placed to a virtual telephone number, an arrangement whereby a subscriber for the virtual number can prescribe which destination stations shall receive calls from which geographic territories, comprising:
    (a) a first database having data relating telephone numbers of the calling stations to geographical indicators of corresponding locations of the calling stations;
    (b) a processor configured for assigning a relationship between at least some of the geographical indicators and telephone numbers for the destination stations using a graphical user interface;
    (c) a second database storing the relationship between at least some of the geographical indicators and telephone numbers for the destination stations as assigned by said processor, whereby for each call to the virtual number from one of the calling stations the first database is accessed using a telephone number for the calling station to produce a geographical indicator for the calling station for entry into the second database, and the second database yields a telephone number for a destination stations servicing the area indicated by the geographical indicator for inclusion in a routing instruction for the call.

2. An arrangement as recited in claim 1, wherein the geographical indicators are postal zip codes.

3. An arrangement as recited in claim 2, wherein said processor defines at least one geographical territory and said assigned relationship is a correlation between postal zip codes contained in the defined territory and a telephone number for a destination station designated to serve the territory.

4. An arrangement as recited in claim 3, wherein said processor means defines said at least one geographical territory on a map and automatically selects the postal zip codes contained in the defined geographical territory.

5. An arrangement as recited in claim 4, wherein the first and second databases are disposed as adjunct databases to an advanced intelligent network (AIN) system and the routing instruction for the call to the virtual number is produced by the AIN system using the telephone number yielded by the second database.

6. An arrangement as recited in claim 5, wherein the second database is accessible by the subscriber for direct entry of the assigned relationship between postal zip codes for the at least one geographical territory and a telephone number.

7. An arrangement as recited in claim 6, wherein the relationship between postal zip codes and a telephone number for a destination station is in the form of a data table.

8. An arrangement as recited in claim 7, wherein the postal zip codes are in the form of 9-digit codes.

9. For a telephone call originating from a calling station location and placed to a virtual number of a subscriber having a plurality of stations serving various geographical areas, a method for routing the call to an actual telephone number for the subscriber station serving the geographical area containing the location of the calling station, comprising the steps of:
    (a) determining an identification of the calling station;
    (b) accessing a first database having content relating the identification of the calling station to postal zip code of the calling station's geographical location and using the identification of the calling station to obtain from the first database the postal zip code of the calling station's geographical location:
    (c) accessing a second database having content relating the calling station's postal zip code to a branch identification number of a branch location serving the geographical area of the calling station and
    (d) using a branch identification number to access a third database to obtain the actual telephone number of that branch location; and
    (e) routing the call to the actual telephone number obtained.

10. A method as recited in claim 9, wherein the second database is maintained comprising the steps by the subscriber of:
    accessing said second database, and
    changing the content thereof so that the call is routed to an agency of the subscriber's choice.

11. A method as recited in claim 9, wherein said step of accessing the second database comprises looking up a table that has a direct correlation between calling station postal zip code information and subscriber station telephone number.

12. A method as recited in claim 9, wherein said step of accessing the second database comprises looking up a table that correlates calling station postal zip code information with subscriber station identifiers and, in response thereto, looking up a further table that correlates subscriber station identifiers with telephone numbers of the subscriber stations.

13. A method as recited in claim 10, wherein the content of the second database pertains only to the virtual number.

14. A method as recited in claim 10, wherein the identification of the calling station is an automatic number identification (ANI).

15. For telephone calls placed to subscriber virtual telephone numbers from calling stations locations, a database arrangement for use in a system to route the calls to actual telephone numbers designated by subscribers for the respective virtual numbers, comprising:

(a) a common database having data associating the telephone numbers of the calling stations to postal zip codes of the geographic locations of the calling stations, said common database being accessible while a call to one of the virtual numbers from one of the calling stations is being routed, and operative to retrieve, in response to entry of the calling station telephone number, a postal zip code for the calling station; and (b) a plurality of sets of second databases, one for each virtual number and having data relating at least some of the geographical indicators to actual telephone numbers designated by a subscriber for the virtual number, each of said sets of second database being accessible while a call to a virtual number from one of the calling stations is being routed and operative to retrieve, from a first database of a set of second databases in response to retrieval of a postal zip code from the common database, a branch identification of a branch location to which the call is to be routed and from a second database of said set of second databases, the actual telephone number of that branch location, using said branch identification.

16. A database arrangement as recited in claim 15, further including a plurality of graphical processing terminals, at least one for use by each subscriber, for graphically defining geographical territories from which calls are to be routed for at least one of the virtual telephone numbers and for designating the actual telephone numbers to which the calls are to be routed, said processor including a mapping means by which said territories are defined and from which said postal zip codes are automatically extracted for the designated telephone numbers to create the content for the second database for that virtual number.

17. A database arrangement as recited in claim 16, wherein at least one of the second databases is directly accessible by the subscriber for the virtual number therefor so that said subscriber can alter the contents thereof.

18. A database arrangement as recited in claim 17, wherein the access to the common database and each of the plurality of second databases while a call to one of the virtual numbers is being routed is from an integrated service control point (ISCP) of an advanced intelligent network (AIN).

19. A database arrangement as recited in claim 18, wherein the postal zip codes are in the form of 9-digit codes.

20. For use with a system in which calls to a virtual telephone number from calling stations are routed to an actual telephone number available for response to calls placed from a territory that includes the calling stations and in which the actual telephone number is retrieved from a database having a routing plan that relates a geographical indicator of each location of the calling stations to the actual number, a graphical processing terminal for defining at least one such territory and for generating the routing plan therefor, comprising:

(a) a mapping module for creating and displaying an area map covering a geographical area sufficiently extensive to encompass at least the one territory, said area map being created from indicators of geographical points and line segments applicable to the geographical area of the map; and (b) an interface module for graphically selecting and bounding an area within the geographical area of the map desired to become the territory using a graphical user interface, said interface module being operative on command to extract the indicator of each geographical point that is within the bounded area, to compile all extracted indicators into a file, and to formulate the routing plan by assigning the actual telephone number to each extracted indicator.

21. A graphical processing terminal as recited in claim 20, wherein the indicators of graphical points are postal zip codes.

22. A graphical processing terminal as recited in claim 21, wherein the mapping module and the interface module comprise means to display and formulate routing plans for multiple territories, respectively, and further include means to sort routing plans formulated for the multiple territories into an overall routing plan applicable to the virtual number.

23. A graphical processing terminal as recited in claim 22, wherein the postal zip codes are in the form of 9-digit codes.

24. A graphical processing terminal as recited in claim 22, wherein the area map is a street map and the line segments are in the form of street segments.

25. The graphical processing terminal as recited in claim 24, wherein the overall routing plan is compatible for use in a database accessible from an advanced intelligent network (AIN).

26. For use with a system in which calls to a virtual telephone number from calling stations are routed to actual telephone numbers available for response to calls placed from respective territories that include the calling stations and in which the actual telephone numbers are retrieved from a database having a routing plan that relates a geographical indicator of each calling station location to the actual telephone number, a method for defining at least one such territory and for generating the routing plan therefor, comprising the steps of:

(a) producing an area map from indicators of geographical points and line segments such that the map is extensive enough to cover at least the one territory; and (b) selecting and bounding an area within a geographical area of the map desired to become the territory using a graphical user interface;

(c) extracting the indicator of each geographical point that is within the bounded area and compiling all extracted indicators into a file; and (d) formulating the routing plan by assigning the actual telephone number to each extracted indicator.

27. A method as recited in claim 26, wherein the indicator of each graphical point is a postal zip code.

28. A method as recited in claim 27, wherein the steps (b) through (d) are repeated to formulate routing plans for multiple territories and including a further step for:

(e) sorting plans formulated for the multiple territories into an overall routing plan applicable to the virtual number.

29. A method as recited in claim 28, wherein the postal zip codes are in the form of 9-digit codes.

30. A method as recited in claim 29, wherein the area map is produced in the form of a street map and the line segments are in the form of street segments.

31. A method as recited in claim 26, further including the step of accessing said database from an advanced intelligent network (AIN).

32. For a telephone call placed from a calling station location to a virtual telephone number of a subscriber, a system for automatically routing the call to an actual telephone number of a subscriber station assigned to respond to calls placed from the geographical area, comprising:

(a) switching means for receiving the call from the calling station and, responsive to recognizing the call as one being placed to a virtual number, for suspending processing of the call to formulate a routing query message containing an identification of the calling station and the virtual telephone number;

(b) a service control point (SCP) means, accessible by the switching means while processing of the call is suspended, to receive the routing query message and responsive thereto to formulate a response message containing routing instructions for return to the switching means;

(c) a first database having data relating the calling station identity to a geographical indicator of the calling station location, said first database being accessible by the SCP for retrieval of the geographical indicator upon entry of the calling station identity; and (d) a second database corresponding to the virtual number and comprising data relating the geographical indicator to a branch identification of a branch location having the actual telephone number to which the call is to be routed, (e) a third database relating a plurality of branch identifications to respective actual telephone numbers; said second and third databases being accessible by the SCP for retrieval of said actual telephone number upon entry of the geographical indicator and operative to yield the actual telephone number to the SCP for inclusion in the routing message returned to the switching means; and wherein the switching means is operative to resume processing of the call upon receipt of the response message to route the call to the actual telephone number.

33. The system of claim 32, wherein the geographical indicator of the calling station location is the postal zip code therefor.

34. The system of claim 33, wherein the calling station identity is an automatic number identification (ANI).

35. The system of claim 34, wherein the second database is accessible by the subscriber for changing the content thereof so that the subscriber can change the actual telephone number to which the call is routed.

36. The system of claim 34, further including a graphical processor for use by the subscriber for defining the geographical area and the content of the second database, said graphical processor including a mapping means for creating a map from which the geographical area is defined and an extraction means for extracting at least the postal zip code for the calling station from the map and assigning the actual telephone number thereto.

* * * * *